No. 118,896. W. H. Barker. Pot Cover. Patented Sep. 12, 1871.

Witnesses:
P. C. Dieterich.
Wm. H. C. Smith.

Inventor:
W. H. Barker.
per Munn & Co.
Attorneys.

UNITED STATES PATENT OFFICE.

WILLIAM HENRY BARKER, OF WINDSOR, CANADA.

IMPROVEMENT IN POT-COVERS.

Specification forming part of Letters Patent No. 118,896, dated September 12, 1871.

*To all whom it may concern:*

Be it known that I, WILLIAM HENRY BARKER, of Windsor, in the county of Hants, Nova Scotia, Dominion of Canada, have invented a new and Improved Pot-Cover; and I do hereby declare that the following is a full, clear, and exact description thereof, which will enable others skilled in the art to make and use the same, reference being had to the accompanying drawing forming part of this specification.

My invention consists in improving the covers of culinary vessels, as hereinafter fully described and subsequently pointed out in the claim.

Figure 1:
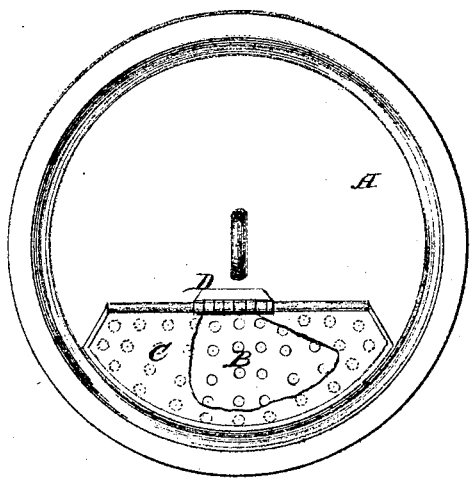
Figure 2:
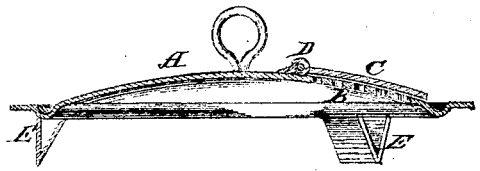

Figure 1 is a plan view of my improved pot-cover with a part of the cover for the holes broken out, and Fig. 2 is a sectional elevation of the same.

Similar letters indicate corresponding parts.

A is a stamped sheet-metal pot-cover of the ordinary kind, with a number of small holes made through it in one part near the edge, as shown at B, to admit of pouring off the contents of the pot without lifting the cover. C is a small lid, hinged to the upper side of the pot-cover, as shown at D, to fall down over the holes B and close them, so as not to allow the steam to escape while it is required that the pot be covered. E represents projections for entering the pot to hold the cover from falling off when the pot is tilted to pour off the liquid contents; but these may or may not be used, as preferred.

The improvement is applicable to pot-covers of all kinds, and I propose to apply it to any.

Having thus described my invention, I claim as new and desire to secure by Letters Patent—

A hinged safety-valve or supplemental cover, C, arranged over the perforations in the cover of a culinary vessel, as and for the purpose specified.

WILLIAM HENRY BARKER.

Witnesses:
 ROLAND MORTON STERLING,
 D. S. BURNHAM.